(12) United States Patent
Mizuno et al.

(10) Patent No.: US 10,923,771 B2
(45) Date of Patent: Feb. 16, 2021

(54) METHOD FOR MANUFACTURING LAMINATED ELECTRODE BODY

(71) Applicant: TOYOTA JIDOSHA KABUSHIKI KAISHA, Toyota (JP)

(72) Inventors: Satoru Mizuno, Okazaki (JP); Akira Tsukao, Nishio (JP); Norihiro Yamada, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 327 days.

(21) Appl. No.: 16/033,305

(22) Filed: Jul. 12, 2018

(65) Prior Publication Data
US 2019/0027787 A1 Jan. 24, 2019

(30) Foreign Application Priority Data

Jul. 24, 2017 (JP) ................................. 2017-142952

(51) Int. Cl.
| | |
|---|---|
| *H01M 10/0585* | (2010.01) |
| *H01M 10/04* | (2006.01) |
| *H01M 10/0525* | (2010.01) |
| *H01G 11/54* | (2013.01) |
| *H01G 11/22* | (2013.01) |
| *H01G 13/02* | (2006.01) |

(52) U.S. Cl.
CPC ..... *H01M 10/0585* (2013.01); *H01M 10/045* (2013.01); *H01M 10/0413* (2013.01); *H01M 10/0436* (2013.01); *H01M 10/0525* (2013.01); *H01G 11/22* (2013.01); *H01G 11/54* (2013.01); *H01G 13/02* (2013.01); *Y10T 29/49108* (2015.01); *Y10T 29/49112* (2015.01)

(58) Field of Classification Search
CPC ......... H01M 10/0413; H01M 10/0436; H01M 10/045; H01M 10/0525; H01M 10/0585; H01G 13/02; H01G 11/22; H01G 11/54; Y10T 29/49108; Y10T 29/49112
See application file for complete search history.

(56) References Cited

U.S. PATENT DOCUMENTS

| | | | | |
|---|---|---|---|---|
| 2003/0162077 A1* | 8/2003 | Ohtani | .............. | Y10T 29/49108 72/340 |
| 2013/0189569 A1* | 7/2013 | Youm | ............... | H01M 10/0583 429/185 |

FOREIGN PATENT DOCUMENTS

| | | | | | |
|---|---|---|---|---|---|
| JP | 58026462 | A | * | 2/1983 | .............. H01M 6/10 |
| JP | 2011-138675 | A | | 7/2011 | |
| JP | 2013-137978 | A | | 7/2013 | |

* cited by examiner

*Primary Examiner* — A. Dexter Tugbang
(74) *Attorney, Agent, or Firm* — Sughrue Mion, PLLC

(57) ABSTRACT

Provided is a method for manufacturing a laminated electrode body which is excellent in terms of productivity and production cost. The method for manufacturing a laminated electrode body disclosed herein includes the steps of: preparing a wound body having a flat portion and two curved portions by using a laminate formed of an elongated positive electrode, an elongated negative electrode, and an elongated separator that insulates the positive electrode and the negative electrode from each other; preparing an electrode laminate structure having two cut surfaces by cutting out and removing the two curved portions of the wound body; and removing active materials on the cut surfaces of the electrode laminate structure by spraying an inactive gas or electrically insulating particles onto the cut surfaces while applying, to the electrode laminate structure, a voltage of 25 V or more and less than a voltage causing a dielectric breakdown of the separator.

2 Claims, 10 Drawing Sheets

METHOD FOR MANUFACTURING LAMINATED ELECTRODE BODY

BACKGROUND OF THE INVENTION

1. Field of the Invention

The present teaching relates to a method for manufacturing a laminated electrode body. The present application claims priority based on Japanese Patent Application No. 2017-142952 filed on Jul. 24, 2017, the entire contents of which are hereby incorporated by reference.

2. Description of the Related Art

In recent years, nonaqueous electrolyte secondary batteries such as lithium ion secondary batteries have been advantageously used as portable power sources for personal computers, mobile terminals and the like, and drive power sources for vehicles such as electric vehicles (EV), hybrid vehicles (HV) and plug-in hybrid vehicles (PHV).

Typically, a nonaqueous electrolyte secondary battery has a configuration in which an electrode body including a positive electrode, a negative electrode, and a separator that insulates the positive electrode and the negative electrode is housed together with a nonaqueous electrolyte in a battery case. The batteries mainly use two kinds of electrode bodies, that is, wound electrode body obtained by laminating one elongated positive electrode, one elongated negative electrode, and two elongated separators and winding the laminate, and a laminated electrode body obtained by laminating a plurality of positive electrode sheets, a plurality of negative electrode sheets, and a plurality of separator sheets.

The laminated electrode body is advantageous in terms of space efficiency and uniform battery reaction. However, since the laminated electrode body is generally manufactured by laminating a plurality of positive electrode sheets, a plurality of negative electrode sheets, and a plurality of separator sheets one by one, manufacturing thereof is complicated, and the laminated electrode body is disadvantageous in terms of productivity and production cost. In this regard, Japanese Patent Application Publication No. 2011-138675 discloses an electrode body in which a positive electrode sheet and a negative electrode sheet are laminated in a zigzag manner with a separator interposed therebetween, and at least one electrode sheet of the positive electrode sheet and negative electrode sheet has an uncoated portion, in which an active material mixture layer is not formed on the electrode sheet, at a curved portion located in the folder portion of the electrode group.

Further, in Japanese Patent Application Publication No. 2013-137978, an electrode body is manufactured by alternately laminating an elongated positive electrode sheet and an elongated negative electrode sheet while disposing the sheets in a zigzag manner, and regions where the positive electrode sheet and negative electrode sheet cross each other are punched out.

SUMMARY OF THE INVENTION

When disposing the electrodes in a zigzag manner as disclosed in Japanese Patent Application Publication No. 2011-138675 and Japanese Patent Application Publication No. 2013-137978, it is possible to simplify the manufacturing process to some extent as compared with a case where a plurality of positive electrodes and a plurality of negative electrodes are simply laminated. However, since the operation of disposing the electrodes in a zigzag manner is still complicated, a device with a complicated configuration is required. In addition, in Japanese Patent Application Publication No. 2011-138675, the presence of folded portions in the electrode body causes a problem with space efficiency, but in Japanese Patent Application Publication No. 2013-137978, this problem is resolved by punching out the regions where the positive electrode sheet and the negative electrode sheet cross each other. However, when the laminated positive electrode sheet and the negative electrode sheet are punched out, a short circuit may occur between the positive electrode sheet and the negative electrode sheet, causing a reduction in yield. Therefore, in the related art, there is room for improvement in terms of productivity and production cost.

Accordingly, it is an object of the present teaching to provide a method for manufacturing a laminated electrode body having excellent productivity and production cost.

The method for manufacturing a laminated electrode body disclosed herein includes the steps of: preparing a wound body having a flat portion and two curved portions by using a laminate formed of an elongated positive electrode, an elongated negative electrode, and an elongated separator that insulates the positive electrode and the negative electrode from each other; preparing an electrode laminate structure having two cut surfaces by cutting out and removing the two curved portions of the wound body; and removing active materials on the cut surfaces of the electrode laminate structure by spraying an inactive gas or electrically insulating particles onto the cut surfaces while applying, to the electrode laminate structure, a voltage of 25 V or more and less than a voltage causing a dielectric breakdown of the separator.

With such a configuration, a conventional device for manufacturing a wound electrode body can be used, no device requiring complicated operation is needed, and an increase in production cost can be suppressed. Further, with such a configuration, since it is possible to eliminate a short circuit occurring in the manufacturing process, a reduction in yield can be suppressed. Furthermore, with such a configuration, it is possible to shorten the time required for manufacturing the laminated electrode body, as compared with the conventional methods. Therefore, with such a configuration, a method for manufacturing a laminated electrode body excellent in productivity and production cost is provided.

In a desired embodiment of the method for manufacturing a laminated electrode body disclosed herein, in the step of removing active materials on the cut surfaces, a voltage of 50 V or more is applied to the electrode laminate structure.

With such a configuration, a short circuit can be prevented more reliably, and a reduction in yield can be further suppressed.

DESCRIPTION OF THE PREFERRED EMBODIMENTS

Figure 1:
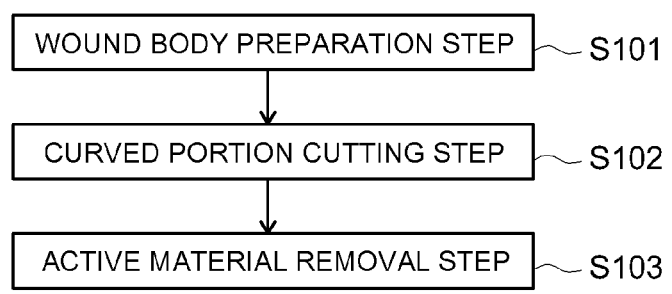
FIG. 1 is a flowchart illustrating each step of the method for manufacturing a laminated electrode body according to one embodiment of the present teaching.

Embodiments of the present teaching will be described below with reference to the drawings. Incidentally, the matters other than those specifically mentioned in the present specification, but still necessary for the implementation of the present teaching (for example, the general configuration and production process of a laminated electrode body which do not characterize the present teaching) can be understood as design matters for a person skilled in the art, those design matters being based on the related art in the pertinent field. The present teaching can be carried out based on the contents disclosed in this specification and technical common sense in the field. In addition, in the following drawings, the same reference numerals are attached to members and parts that exhibit the same action. Further, the dimensional relationship (length, width, thickness, and the like) in each drawing does not reflect the actual dimensional relationship.

FIG. 1 shows each step of the method for manufacturing a laminated electrode body according to the present embodiment. The method for manufacturing a laminated electrode body according to the present embodiment includes a step S101 of preparing a wound body having a flat portion and two curved portions by using a laminate formed of an elongated positive electrode, an elongated negative electrode, and an elongated separator that insulates the positive electrode and the negative electrode from each other (wound body preparation step); a step S102 of preparing an electrode laminate structure having two cut surfaces by cutting out and removing the two curved portions of the wound body (curved portion cutting step); and a step S103 of removing active materials on the cut surfaces of the electrode laminate structure by spraying an inactive gas or electrically insulating particles onto the cut surfaces while applying, to the electrode laminate structure, a voltage of 25 V or more and less than a voltage causing a dielectric breakdown of the separator (active material removal step).

First, a wound body preparation step S101 is explained. The wound body preparation step S101 can be carried out by a method similar to a well-known method for preparing a wound electrode body having a flat shape for a nonaqueous electrolyte secondary battery (in particular, a lithium ion secondary battery).

Figure 2:
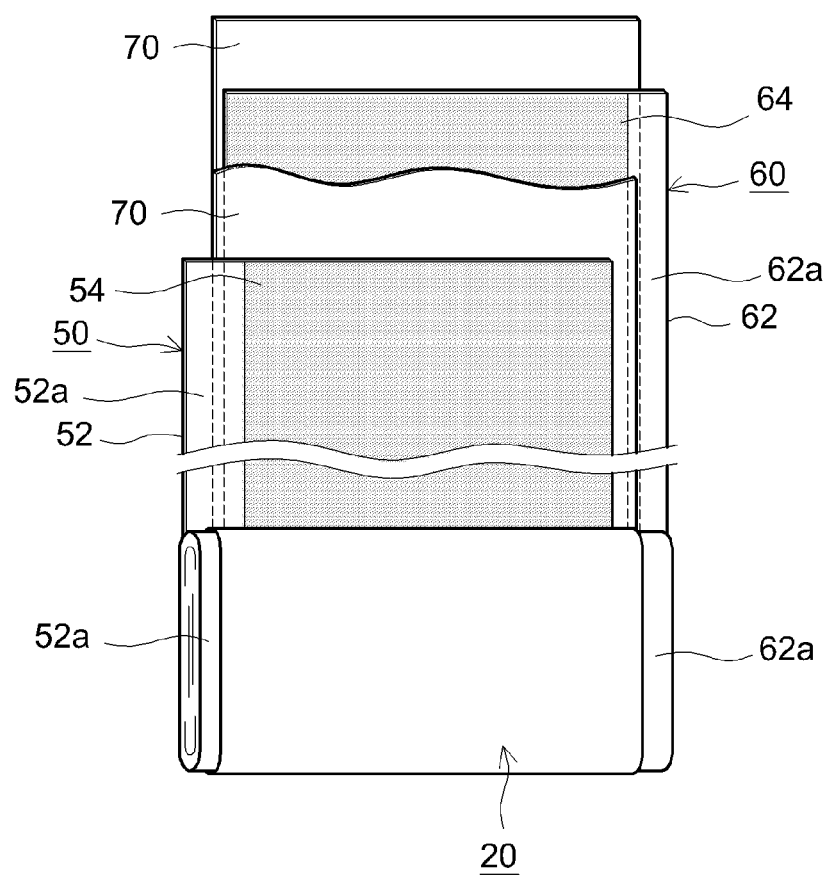
FIG. 2 is a schematic view showing a configuration of a wound electrode body prepared by the wound body preparation step of the method for manufacturing a laminated electrode body according to one embodiment of the present teaching.
Figure 3:
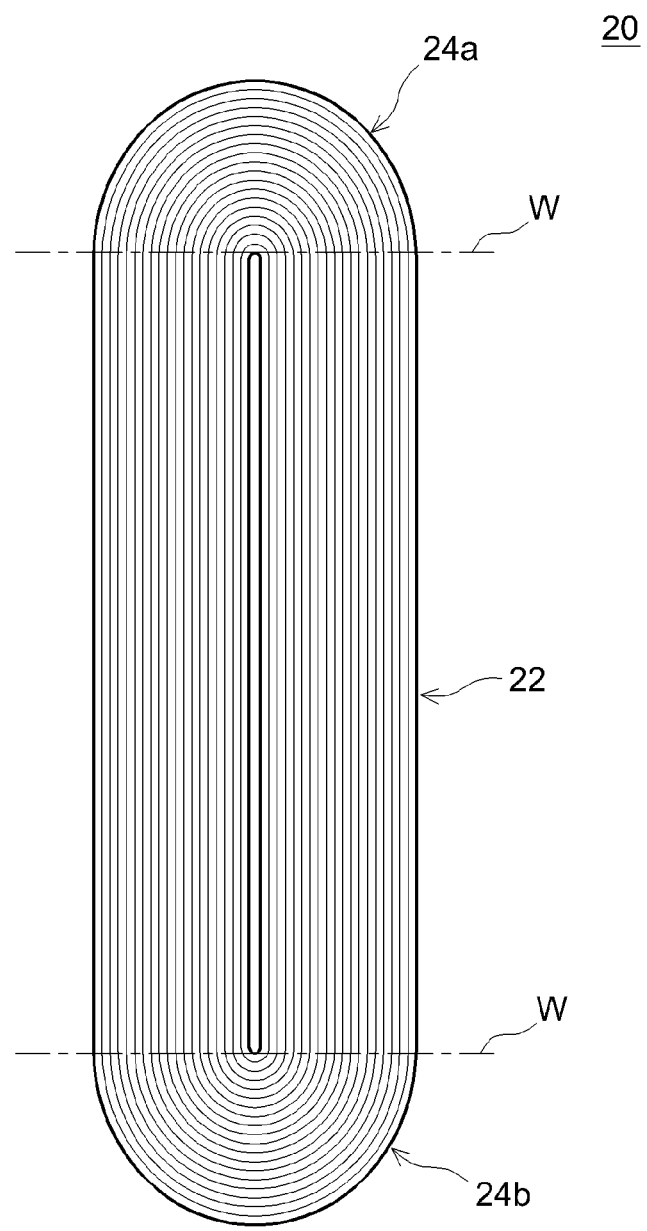
FIG. 3 is a schematic cross-sectional view showing a configuration of a wound electrode body prepared by the wound body preparation step of the method for manufacturing a laminated electrode body according to one embodiment of the present teaching.

FIG. 2 schematically shows the configuration of the wound body prepared by the wound body manufacturing step S101 of the manufacturing method according to the present embodiment. FIG. 3 is a schematic cross-sectional view of the wound body prepared in the wound body preparation step S101 of the manufacturing method according to the present embodiment.

As shown in the drawings, the wound body 20 has a flat shape and has a flat portion 22 and two curved portions 24a, 24b. A line W in FIG. 3 is a line connecting the starting point and the ending point of the curve in the cross-sectional contour of the wound body 20 and is a boundary line between the flat portion 22 and each of the curved portion 24a and the curved portion 24b.

Specifically, in the wound body preparation step S101, for example, first, an elongated positive electrode 50, an elongated negative electrode 60, and an elongated separator 70 are prepared according to a known method.

For example, the positive electrode 50 can be prepared by mixing a positive electrode active material, a conductive material, a binder, and the like in an appropriate solvent (for example, N-methyl-2-pyrrolidone) to prepare a positive electrode paste, coating the positive electrode paste on one or two surfaces of a positive electrode collector 52, and then drying. Regarding coating, the positive electrode paste is typically coated in the longitudinal direction along one end portion in the width direction of the position electrode collector 52 so that a positive electrode active material layer 54 and a positive electrode active material layer non-formation portion 52a shown in FIG. 2 are formed. After drying, the positive electrode 50 may be pressed appropriately.

For example, an aluminum foil or the like can be used as the positive electrode current collector 52.

Examples of the positive electrode active material include lithium transition metal oxides (for example, $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$, and the like) and lithium transition metal phosphate compounds (for example, $LiFePO_4$ and the like).

For example, carbon black such as acetylene black (AB) or other carbon materials (for example, graphite or the like) can be advantageously used as the conductive material.

For example, polyvinylidene fluoride (PVDF) or the like can be used as the binder. For example, the negative electrode 60 can be prepared by mixing a negative electrode active material, a binder, a thickener, and the like in an appropriate solvent (for example, water) to prepare a negative electrode paste, coating the negative electrode paste on one or both surfaces of the negative electrode current collector 62 and then drying. Regarding coating, the negative electrode paste is typically coated in the longitudinal direction along one end portion in the width direction of the negative electrode collector 62 so that a negative electrode active material layer 64 and a negative electrode active material layer non-formation portion 62a shown in FIG. 2 are formed. After drying, the negative electrode 60 may be pressed appropriately.

For example, a copper foil or the like can be used as the negative electrode current collector 62.

For example, a carbon material such as graphite, hard carbon, and soft carbon can be used as the negative electrode active material.

For example, styrene butadiene rubber (SBR) or the like can be used as the binder.

For example, carboxymethyl cellulose (CMC) or the like can be used as the thickener.

For example, a porous sheet (film) made of a resin such as polyethylene (PE), polypropylene (PP), polyester, cellulose, and polyamide can be used as the separator 70. Such a porous sheet may have a single-layer structure or a laminate structure of two or more layers (for example, a three-layer structure in which a PP layer is laminated on both surfaces of a PE layer). A heat-resistant layer (HRL) may be provided on the surface of the separator 70.

Next, a laminated body of the positive electrode 50, the negative electrode 60, and the separator 70 is prepared. Specifically, the positive electrode 50 and the negative electrode 60 are overlapped with the two separators 70 interposed therebetween. At this time, typically, as shown in FIG. 2, these are overlapped so that the positive electrode active material layer non-formation portion 52a provided at the end portion in the width direction of the positive electrode 50 and the negative electrode active material layer non-formation portion 62a provided at the end portion in the width direction of the negative electrode 60 protrude in mutually opposite directions.

Subsequently, the wound body 20 is prepared using the obtained laminate. Specifically, for example, the wound body 20 having the flat portion 22 and the two curved portions 24a, 24b can be obtained by winding the obtained laminate and crushing it from the side face direction. Alternatively, the wound body 20 having the flat portion 22 and the two curved portions 24a, 24b may be prepared by winding so that the wound body has a flat-shaped cross section.

The wound body 20 corresponds to the conventional wound electrode body. Therefore, the wound body 20 can be prepared using an apparatus for manufacturing the conventional wound electrode body. The apparatus for manufacturing a conventional wound electrode body generally has a simple configuration.

Figure 4:
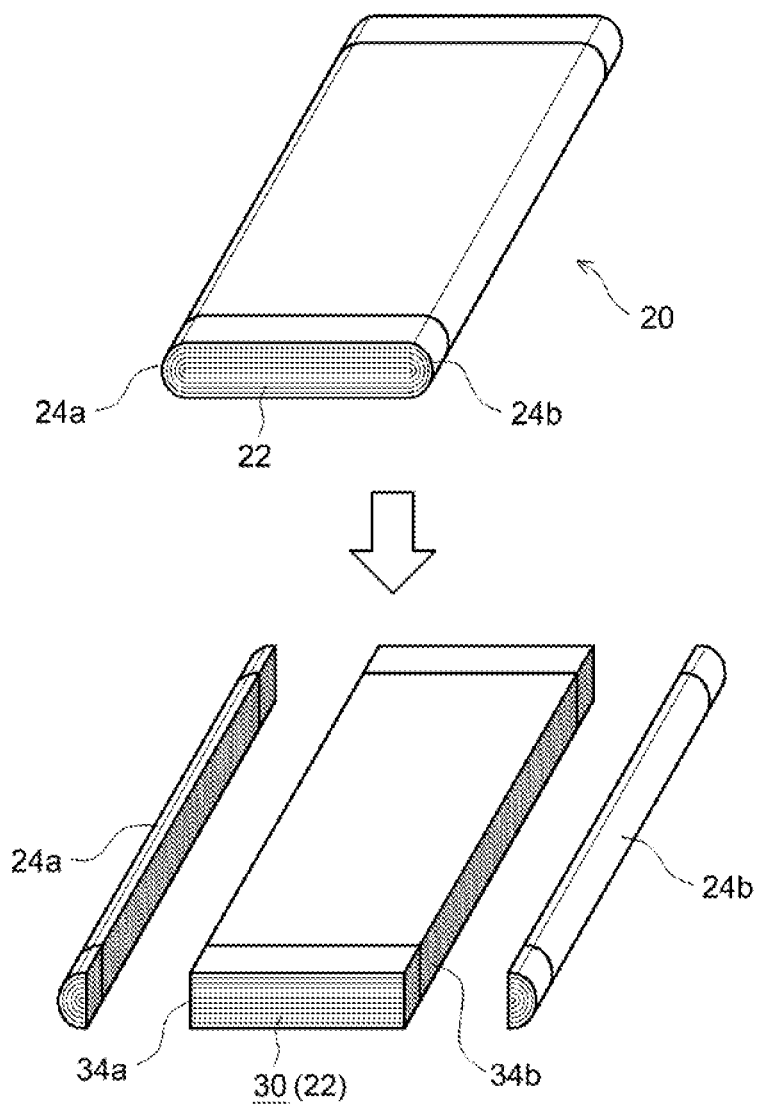
FIG. 4 is a schematic view showing an outline of the curved portion cutting step of the method for manufacturing a laminated electrode body according to one embodiment of the present teaching.

Next, the curved portion cutting step S102 will be described. FIG. 4 schematically shows the outline of the curved portion cutting step S102.

In the curved portion cutting step S102, the two curved portions 24a, 24b of the wound body 20 are cut and removed. Therefore, the cutting is performed along the thickness direction of the flat-shaped wound body 20 so that the two curved portions 24a, 24b are removed. For example, the cutting may be performed along the line W in FIG. 2, or along the thickness direction on the inner side (on the flat portion 22 side) of line W.

The cutting can be carried out using a known cutting device.

By cutting and removing the two curved portions 24a, 24b of the wound body 20, it is possible to prepare the electrode laminate structure 30 derived from the flat portion 22 and having two cut surfaces 34a, 34b.

Figure 5:
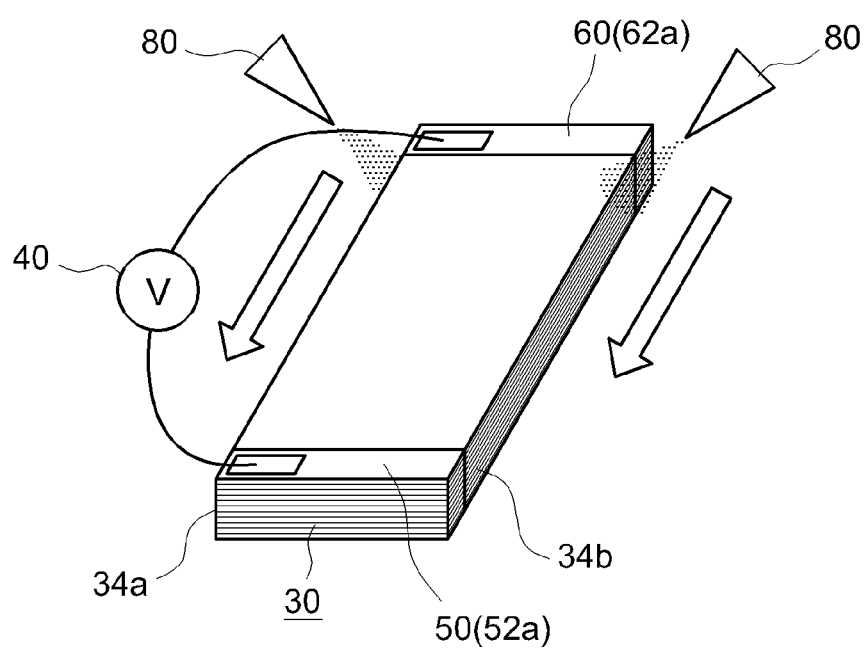
FIG. 5 is a schematic view showing an outline of the active material removal step of the method for manufacturing a laminated electrode body according to one embodiment of the present teaching.

Next, the active material removal step S103 will be described. FIG. 5 schematically shows the outline of the active material removal step S103.

In the active material removal step S103, first, a voltage applying device 40 is attached to the electrode laminate structure 30. For example, as shown in FIG. 5, the voltage applying device 40 is connected to the positive electrode active material layer non-formation portion 52a of the positive electrode 50 and the negative electrode active material layer non-formation portion 62a of the negative electrode 60. A known voltage applying device can be used as the voltage applying device 40.

Subsequently, a voltage of 25 V or more and less than a voltage causing a dielectric breakdown of the separator 70 (for example, 250 V in the present embodiment) is applied by the voltage applying device 40 to the electrode laminate structure 30. Then, an inactive gas or insulating particles are sprayed from a spraying device 80 onto the two cut surfaces 34a, 34b of the electrode laminate structure 30 while applying the voltage. By this spraying, the active material (particles) on the cut surfaces 34a, 34b are removed.

The type of the inactive gas is not limited as long as the gas does not react with the constituent material of the electrode laminate structure 30 to impair the performance of the electrode laminate structure 30 as an electrode. For example, argon (Ar) gas, nitrogen gas or the like can be used as the inactive gas, and argon gas is desirable.

The spraying condition may be appropriately selected so as not to damage the electrode laminate structure 30.

When an inactive gas is sprayed, a known gas spraying device can be used as the spraying device 80.

As the insulating particles, known insulating particles may be used, and inorganic particles or organic particles may be used.

The type and shape of the insulating particles and the spraying conditions may be selected as appropriate so as not to damage the electrode laminate structure 30.

In the case of spraying insulating particles, the spraying device 80 is, for example, a low-pressure sandblasting device or the like.

The spraying of the inactive gas or insulating particles may be carried out simultaneously onto the two cut surfaces 34a, 34b, or the cut surfaces 34a and 34b may be sprayed one after the other.

Where the voltage applied to the electrode laminate structure 30 is too low, the active material cannot be sufficiently removed. Therefore, the voltage is 25 V or more, and is desirably 50 V or more from the viewpoint of more reliably removing the active material and eliminating the short circuit. Meanwhile, in order to prevent the internal short circuit of the electrode laminate structure 30, the applied voltage is lower than the voltage causing a dielectric breakdown of the separator 70 and is desirably equal to or lower than the voltage which is 50 V lower than the voltage causing a dielectric breakdown of the separator 70, for example, 1000 V or less. The voltage causing a dielectric breakdown of the separator 70 is determined technically depending on the material, size, structure, and the like of the separator 70.

Figure 6:
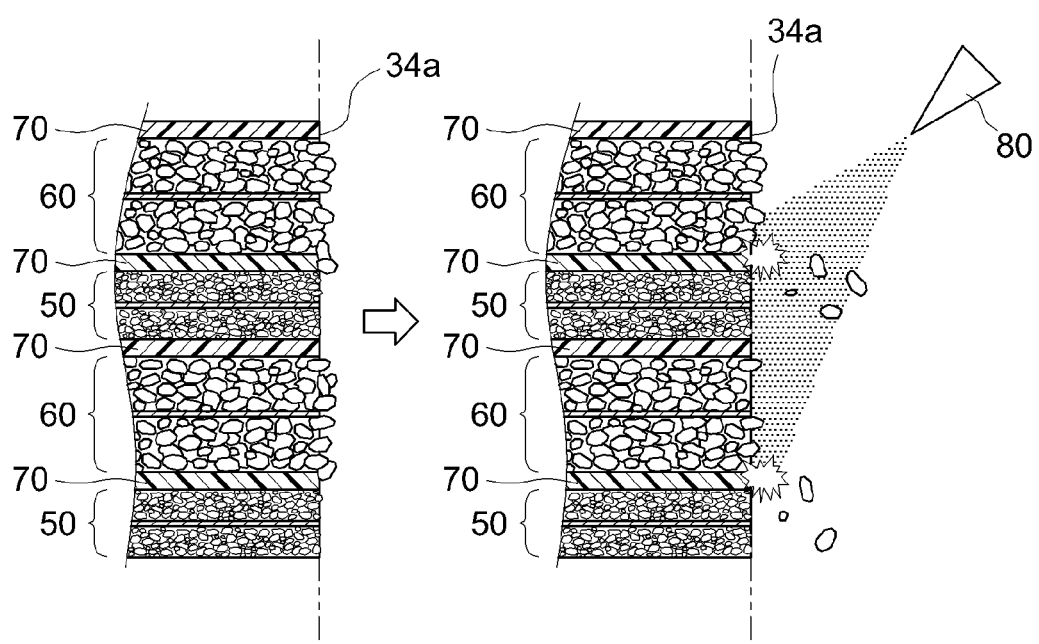
FIG. 6 is a conceptual diagram for explaining a spraying operation in the active material removal step of the method for manufacturing a laminated electrode body according to one embodiment of the present teaching.

FIG. 6 is a conceptual diagram for explaining a spraying operation in the active material removal step. In the cut surface of the electrode laminate structure 30 (in FIG. 6, only the cut surface 34a is shown; the same applies to the cut surface 34b), the active material particles contained in the positive electrode 50 and the negative electrode 60 can be moved in the cutting direction by the stress at the time of cutting. As a result of this movement, the active material particles contained in the positive electrode 50 may contact the negative electrode 60, or the active material particles contained in the negative electrode 60 may contact the positive electrode 50. In these cases, the active material particles cause a short circuit.

Here, when a predetermined voltage is applied to the electrode laminate structure 30, a spark occurs at the location of the short circuit caused by the active material particles. By spraying an inactive gas or insulating particles at this time, it is possible to effectively remove the active material particles causing the short circuit.

Incidentally, the active material particles are likely to fall off on the cut surfaces 34*a*, 34*b*, and when the active material particles fall off after the preparation of the non-aqueous electrolyte secondary battery, the active material particles can become conductive foreign matter. Therefore, in the active material removal step S103, it is sufficient to remove the active material particles which are the cause of the short circuit. However, as a result of spraying, the active material particles other than the active material particles which cause the short circuit (in particular, active material particles which are likely to fall off from the active material layer) may be removed.

Through the wound body preparation step S101, the curved portion cutting step S102, and the active material removal step S103 described above, a laminated electrode body can be obtained.

The results obtained by the inventors of the present teaching in actual preparation of a laminated electrode body by the method for manufacturing a laminated electrode body according to the present embodiment will be described hereinbelow.

The inventors first prepared a laminate formed of a positive electrode, a negative electrode, and a separator, and wound the laminate to prepare a wound body. Then, the curved portions of the wound body were cut with a cutting device to obtain an electrode laminate structure.

Figure 7:
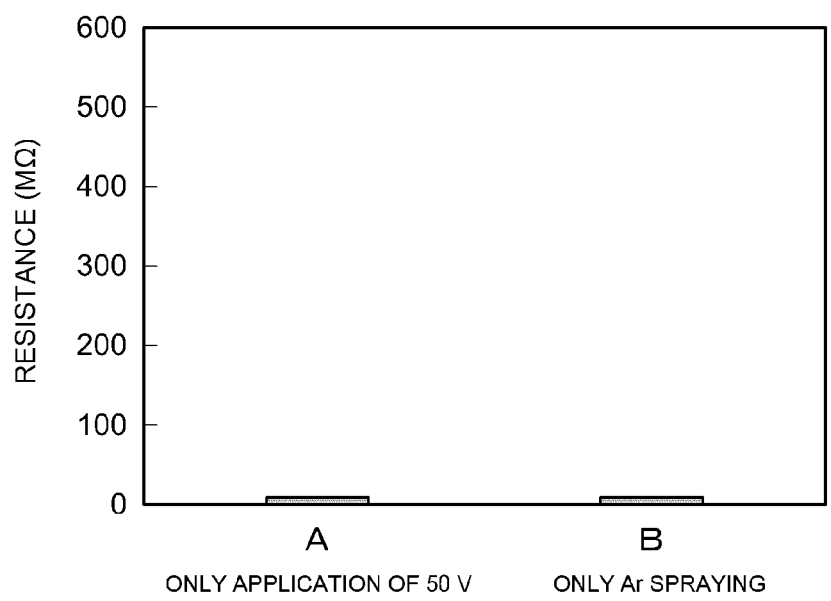
FIG. 7 is a graph showing a resistance value of an example in which only voltage application was performed and an example in which only Ar gas spraying was performed in actual investigation of the active material removal step.

Next, resistance measurement was performed on the electrode laminate structure after the following treatment. The results are shown in FIG. 7.

A: A voltage of 50 V was applied to the electrode laminate structure, but Ar gas was not sprayed onto the cut surface.

B: Ar gas was sprayed onto the cut surface without applying a voltage to the electrode laminate structure.

Figure 8:
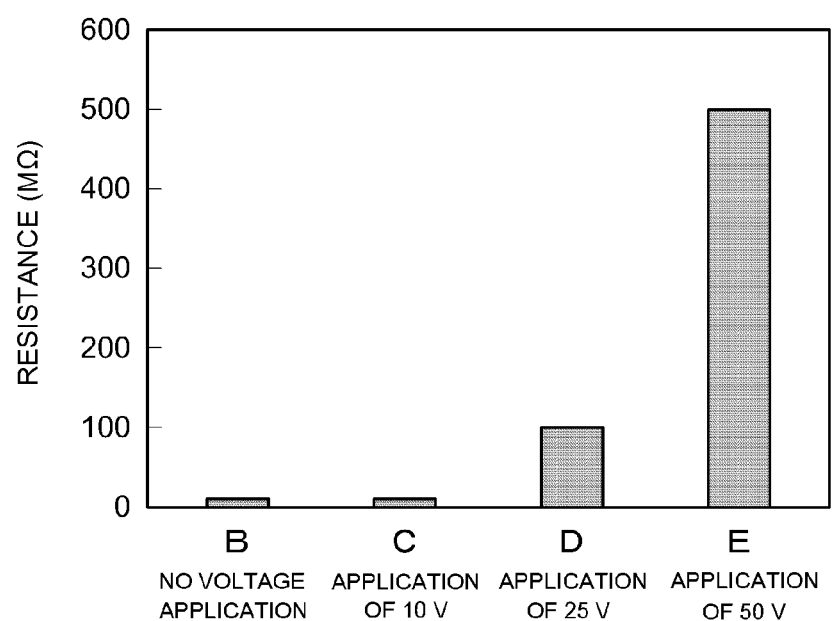
FIG. 8 is a graph showing a resistance value of an example in which an applied voltage was changed in actual investigation of the active material removal step.

Resistance measurement was also performed on the electrode laminate structure after the following treatment. The results are shown in FIG. 8.

C: Ar gas was sprayed onto the cut surface while applying a voltage of 10 V to the electrode laminate structure.

D: Ar gas was sprayed onto the cut surface while applying a voltage of 25 V to the electrode laminate structure.

E: Ar gas was sprayed onto the cut surface while applying a voltage of 50 V to the electrode laminate structure.

From the results shown in FIGS. 7 and 8, it can be understood that the resistance greatly increases when Ar gas is sprayed onto the cut surface while applying a voltage of 25 V or more to the electrode laminate structure. This can be said to be because the active material particles which moved when cutting and removing the curved portion were removed and the short circuit caused by the active material particles was eliminated.

Furthermore, the inventors of the present teaching prepared a laminated electrode body having dimensions of 120 mm in width, 70 mm in height, and 12 mm in depth (thickness) by a general conventional manufacturing method and the manufacturing method according to this embodiment. The general conventional manufacturing method is a method of laminating a plurality of positive electrodes, a plurality of separators, and a plurality of negative electrodes one by one.

Figure 9:
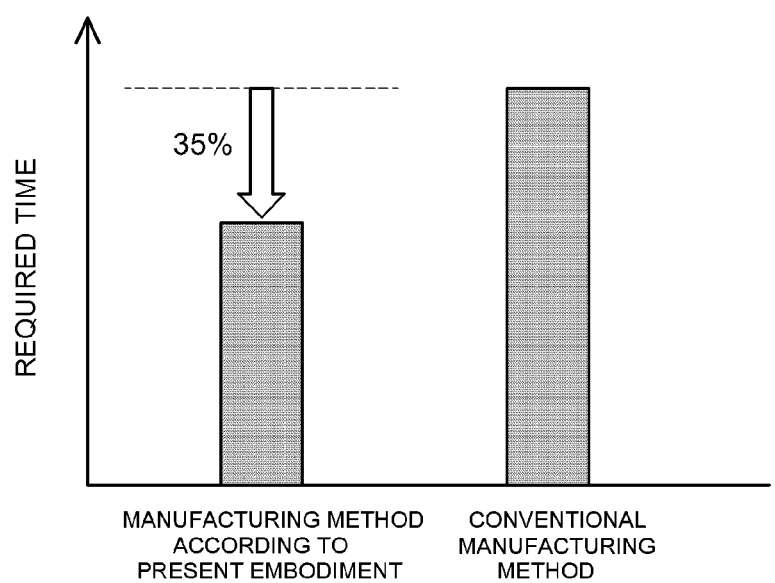
FIG. 9 is a graph showing the actual investigation results on the time required for manufacturing the laminated electrode body by the method for manufacturing a laminated electrode body according to one embodiment of the present teaching and by the conventional method for manufacturing a laminated electrode body.

As a result, in the manufacturing method according to the present embodiment, as shown in FIG. 9, the time required for preparing the laminated electrode body could be reduced by 35% as compared with the general conventional manufacturing method.

In addition, the inventors of the present teaching prepared a wound electrode body having the same capacity as that of the laminated electrode body of the above size by a well-known method.

Lithium ion secondary batteries were prepared using the laminated electrode body obtained by the general conventional manufacturing method, the laminated electrode body obtained by the manufacturing method according to the present embodiment, and the wound electrode body, and a charge/discharge cycle test was carried out on the batteries. In this test, one cycle was formed of constant current charging at 1 C up to a state of charge (SOC) of 100%, constant voltage charging until the current value reached 0.01 C, and constant current discharging at 1 C up to a SOC of 0% at 25° C. The charge/discharge cycles were repeated, and the ratio of the battery capacity to the initial capacity (battery capacity after one cycle charging and discharging) was monitored as a capacity retention rate (%). The results are shown in FIG. 10.

Figure 10:
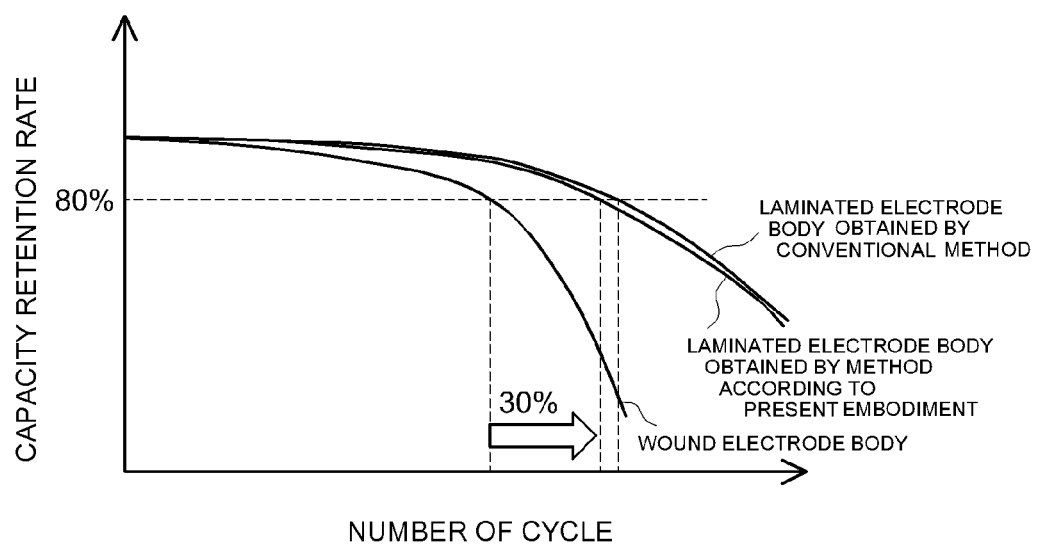
FIG. 10 is a graph showing the evaluation results on a capacity retention rate in a charge/discharge cycle test of lithium ion secondary batteries using the laminated electrode body obtained by the manufacturing method according to the embodiment of the present teaching, the laminated electrode body obtained by the conventional method, and a wound electrode body.

From the results shown in FIG. 10, the capacity retention rate of the lithium ion secondary battery using the laminated electrode body obtained by the manufacturing method according to the present embodiment is the same as the capacity retention rate of the lithium ion secondary battery using the laminated electrode body obtained by the general conventional manufacturing method and is higher than the capacity retention rate of the lithium ion secondary battery using the wound electrode body. In particular, the number of cycles of the lithium ion secondary battery using the laminated electrode body obtained by the manufacturing method according to the present embodiment, at which the capacity retention rate is 80%, is increased by 30% over the number of cycles of the lithium ion secondary battery using the wound electrode body. Where the battery reaction is non-uniform, capacity deteriorates due to precipitation of metallic lithium. Therefore, it can be said that the lithium ion secondary battery using the laminated electrode body obtained by the manufacturing method according to the present embodiment demonstrates an effect of a uniform battery reaction inherent to laminated electrode bodies.

Meanwhile, it was confirmed that the laminated electrode body obtained by the manufacturing method according to the present embodiment has, similarly to the laminated electrode body obtained by a general conventional production method and having the same size, a space efficiency higher than that of the wound electrode body. In particular, in the laminated electrode body obtained by the manufacturing method according to the present embodiment, the space efficiency was improved by 20% with respect to that of the wound electrode body of the same size which was prepared separately and was not provided with the active material layer on the curved portions to ensure uniform battery reaction.

As described above, with the method for manufacturing a laminated electrode body according to the present embodiment, a conventional device for manufacturing a wound electrode body can be used, no device requiring complicated operation is needed, and an increase in production cost can be suppressed. Further, with the method for manufacturing a laminated electrode body according to the present embodiment, since it is possible to eliminate a short circuit occurring in the manufacturing process, a reduction in yield can be suppressed. Furthermore, with the method for manufacturing a laminated electrode body according to the present embodiment, it is possible to shorten the time required for manufacturing the laminated electrode body, as compared with the conventional methods. Therefore, the method for manufacturing a laminated electrode body according to the present embodiment excels in productivity and production cost.

The laminated electrode body obtained by the manufacturing method according to the present embodiment can be used for a nonaqueous electrolyte secondary battery (particularly, a lithium ion secondary battery). Specifically, a nonaqueous electrolyte secondary battery (particularly, a lithium ion secondary battery) can be constructed according to the well-known method by housing the laminated electrode body, which is obtained by the manufacturing method according to the present embodiment, together with a nonaqueous electrolyte in a battery case. The nonaqueous electrolyte secondary battery can be suitably used as a portable power source for a personal computer, a mobile terminal, and the like, or a drive power source for a vehicle such as an electric vehicle (EV), a hybrid vehicle (HV), and a plug-in hybrid vehicle (PHV).

Although specific examples of the present teaching have been described in detail above, these are merely illustrative and do not limit the scope of the claims. Techniques set forth in the claims include those in which the concrete examples exemplified above are variously modified and changed.

What is claimed is:

1. A method for manufacturing a laminated electrode body, the method comprising the steps of:
   preparing a wound body having a flat portion and two curved portions by using a laminate formed of an elongated positive electrode, an elongated negative electrode, and an elongated separator that insulates the positive electrode and the negative electrode from each other;
   preparing an electrode laminate structure having two cut surfaces by cutting out and removing the two curved portions of the wound body; and
   removing active materials on the cut surfaces of the electrode laminate structure by spraying an inactive gas or electrically insulating particles onto the cut surfaces while applying, to the electrode laminate structure, one voltage of 25 V or more and less than another voltage causing a dielectric breakdown of the separator.

2. The method for manufacturing a laminated electrode body according to claim 1, wherein, in the step of removing active materials on the cut surfaces, the one voltage is 50 V or more that is applied to the electrode laminate structure.

* * * * *